(12) United States Patent
Wang et al.

(10) Patent No.: US 11,846,837 B1
(45) Date of Patent: Dec. 19, 2023

(54) DISPLAY DEVICE

(71) Applicant: HUIZHOU CHINA STAR OPTOELECTRONICS DISPLAY CO., LTD., Huizhou (CN)

(72) Inventors: Xinyu Wang, Huizhou (CN); Guofeng Kuang, Huizhou (CN); Yuqing Geng, Huizhou (CN)

(73) Assignee: HUIZHOU CHINA STAR OPTOELECTRONICS DISPLAY CO., LTD., Huizhou (CN)

( * ) Notice: Subject to any disclaimer, the term of this patent is extended or adjusted under 35 U.S.C. 154(b) by 0 days.

(21) Appl. No.: 17/908,127

(22) PCT Filed: Aug. 24, 2022

(86) PCT No.: PCT/CN2022/114603
§ 371 (c)(1),
(2) Date: Aug. 30, 2022

(51) Int. Cl.
*G02F 1/00* (2006.01)
*G02F 1/09* (2006.01)
(Continued)

(52) U.S. Cl.
CPC ............ *G02F 1/092* (2013.01); *G02F 1/1368* (2013.01); *G02F 1/133603* (2013.01);
(Continued)

(58) Field of Classification Search
CPC .. G02F 1/092; G02F 1/1368; G02F 1/133614; G02F 1/133603
See application file for complete search history.

(56) References Cited

U.S. PATENT DOCUMENTS

2015/0344776 A1* 12/2015 Bootman ............. C09K 11/565
252/301.36
2016/0097889 A1* 4/2016 Kim ..................... G02B 6/005
362/606
(Continued)

FOREIGN PATENT DOCUMENTS

CN 104932051 A 9/2015
CN 105487288 B 11/2019
(Continued)

OTHER PUBLICATIONS

PCT International Search Report in International application No. PCT/CN2022/114603, dated Dec. 20, 2022, 12pp.
(Continued)

*Primary Examiner* — Gerald J Sufleta, II
(74) *Attorney, Agent, or Firm* — The Roy Gross Law Firm, LLC; Roy Gross

(57) ABSTRACT

The present invention provides a display device, including a display panel provided with an electromagnetic induction layer and a backlight module provided with a quantum dot film The quantum dot film contains a plurality of second-color quantum dots, a plurality of third-color quantum dots, and a plurality of magnetic particles. The electromagnetic induction layer is configured to generate a directional magnetic field to make the magnetic particles move directionally in the quantum dot film, and to make a density of the second-color quantum dots and the third-color quantum dots located in an edge area of the quantum dot film greater than a density of the second-color quantum dots and the third-color quantum dots located in a central area of the quantum dot film.

20 Claims, 2 Drawing Sheets

(51) Int. Cl.
 *G02F 1/1368* (2006.01)
 *G02F 1/1335* (2006.01)
 *G02F 1/13357* (2006.01)

(52) U.S. Cl.
 CPC .. *G02F 1/133614* (2021.01); *G02F 2201/501* (2013.01); *G02F 2202/36* (2013.01)

(56) References Cited

U.S. PATENT DOCUMENTS

| | | | |
|---|---|---|---|
| 2017/0044056 A1 | 2/2017 | You et al. | |
| 2019/0369444 A1* | 12/2019 | Huang | G02F 1/13394 |
| 2022/0173344 A1* | 6/2022 | Wang | H10K 71/00 |
| 2022/0310983 A1* | 9/2022 | Mei | H01L 33/06 |

FOREIGN PATENT DOCUMENTS

| | | | |
|---|---|---|---|
| CN | 108051886 B | 10/2020 | |
| CN | 114217477 A | 3/2022 | |
| JP | 2016048602 A | 4/2016 | |

OTHER PUBLICATIONS

Written Opinion of the International Search Authority in International application No. PCT/CN2022/114603, dated Dec. 20, 2022, 8pp.

\* cited by examiner

DISPLAY DEVICE

CROSS REFERENCE TO RELATED APPLICATIONS

This application is a National Phase of PCT Patent Application No. PCT/CN2022/114603 having International filing date of Aug. 24, 2022, which claims the benefit of priority of Chinese Application No. 202210914544.3 filed on Aug. 1, 2022. The contents of the above applications are all incorporated by reference as if fully set forth herein in their entirety.

BACKGROUND

Field of Invention

The present invention relates to a field of display technology, and in particular, to a display device.

Description of Prior Art

Quantum dots are a nano-level semiconductor. By applying a certain electric field or a light pressure to the nano-semiconductor materials, the nano-semiconductor materials will emit light with a specific frequency, and the frequency of the emitted light will change with a size of the semiconductors. Therefore, a color of the light emitted by the nano-semiconductor can be controlled by adjusting the size of the nano-semiconductor. Because this type of nano-semiconductor has a property of limiting electrons and electron holes, which is similar to atoms or molecules in nature, so the kind of the nano-semiconductor is called quantum dots. Quantum dots can be applied to backlight modules to greatly improve color reproducibility, color degree, and overall brightness of picture images.

At present, display technologies are increasingly developing towards high performances such as high definition, high color gamut, and high brightness. Mini light-emitting diode (mini-LED) backlight module technology has characteristics of high brightness and high contrast, which brings a visual experience far better than traditional backlight modules to users. According to surveys, e-sports players have special requirements for high-resolution, high color rendering, high-resolution, and cool external appearance, and their consumption desire for upgrading hardware to obtain a better game experience is higher than that of users in other fields. A combination of high-resolution, high color rendering, high-resolution also overlaps with needs of professional display users. Designs of mini-LED backlight modules can easily meet a high-end market demand. At present, mini-LED technology continues to develop in a direction of high partition, zero even light distance, and thinness, and has replaced OLED technology to become a market mainstream. However, ultra-thin and zero even distance are followed by a problem of blue light leakage around the backlight modules. Traditionally, an only solution to solve the blue light leakage around the mini-LED modules is to screen print yellow fluorescent powder around a diaphragm to neutralize the blue light leakage around. However, this scheme needs to repeatedly adjust a phosphor ratio to ensure that a display color of a peripheral is consistent with a display color of an overall display of the module, and development and commissioning cycle is long.

Therefore, the existing technology has defects and needs to be improved and developed.

SUMMARY

The present invention provides a display device, so as to effectively improve a problem of blue light leakage at a light source side in a backlight module and improve a display effect.

In order to solve the above problem, the present invention provides a display device, comprising a backlight module and a display panel located above the backlight module; wherein the display panel comprises a display area and a non-display area surrounding the display area, an electromagnetic induction layer is disposed in the non-display area of the display panel; and the backlight module comprises: a backlight plate; a first-color light source disposed on a side of the backlight plate facing the display panel; a quantum dot film disposed between the first-color light source and the display panel, wherein the quantum dot film contains a plurality of second-color quantum dots, a plurality of third-color quantum dots, and a plurality of magnetic particles distributed discretely, the quantum dot film extends to below the electromagnetic induction layer; the quantum dot film comprises an edge area located in the non-display area and a central area located in the display area; and the electromagnetic induction layer is configured to generate a directional magnetic field in an energized state to make the magnetic particles move directionally in the quantum dot film, and to make a density of the second-color quantum dots and the third-color quantum dots located in the edge area of the quantum dot film greater than a density of the second-color quantum dots and the third-color quantum dots located in the central area of the quantum dot film.

Wherein a color of the first-color light source is blue, a color of the second-color quantum dot is red, and a color of the third-color quantum dot is green.

Wherein the display panel comprises an array substrate, the array substrate comprises an electric control layer disposed in the non-display area, the electric control layer comprises a plurality of thin-film transistors arranged at intervals; the electromagnetic induction layer comprises a plurality of electromagnetic induction electrodes arranged at intervals; and the plurality of thin-film transistors are correspondingly connected to the plurality of electromagnetic induction electrodes one to one.

Wherein the electromagnetic induction layer is located on a side of the electric control layer facing the backlight module.

Wherein a direction of the directional magnetic field generated by the electromagnetic induction electrodes in the energized state is a direction pointing vertically to the quantum dot film.

Wherein a cross-sectional shape of the electromagnetic induction electrode on a first plane is a spiral, and the first plane is a plane parallel to the quantum dot film.

Wherein a light-shielding layer is disposed on a side of the electric control layer away from the quantum dot film, each of the plurality of thin-film transistors comprises a source electrode and a drain electrode, and the plurality of thin-film transistors are correspondingly connected to the plurality of electromagnetic induction electrodes one to one through the corresponding drain electrodes.

Wherein the quantum dot film further comprises a mesoporous material, and/or the magnetic particles are transparent magnetic particles.

Wherein the display panel further comprises an electromagnetic shielding layer, the electromagnetic shielding layer is located above the electromagnetic induction layer, and an orthographic projection of the electromagnetic induction layer on the backlight plate falls within an orthographic projection of the electromagnetic shielding layer on the backlight plate.

Wherein a material of the electromagnetic induction layer comprises indium tin oxide, indium gallium zinc oxide, or indium zinc oxide.

In order to solve the above problem, the present invention further provides a display device, comprising a backlight module and a display panel located above the backlight module; wherein the display panel comprises a display area and a non-display area surrounding the display area, an electromagnetic induction layer is disposed in the non-display area of the display panel; and the backlight module comprises: a backlight plate; a first-color light source disposed on a side of the backlight plate facing the display panel; a quantum dot film disposed between the first-color light source and the display panel, wherein the quantum dot film contains a plurality of second-color quantum dots, a plurality of third-color quantum dots, and a plurality of magnetic particles distributed discretely, the quantum dot film extends to below the electromagnetic induction layer; the quantum dot film comprises an edge area located in the non-display area and a central area located in the display area; and the electromagnetic induction layer is configured to generate a directional magnetic field in an energized state to make the magnetic particles move directionally in the quantum dot film, and to make a density of the second-color quantum dots and the third-color quantum dots located in the edge area of the quantum dot film greater than a density of the second-color quantum dots and the third-color quantum dots located in the central area of the quantum dot film; wherein a working current of the electromagnetic induction layer is configured to make the density of the second-color quantum dots and the third-color quantum dots located in the edge area of the quantum dot film correspond to the working current.

Wherein a color of the first-color light source is blue, a color of the second-color quantum dot is red, and a color of the third-color quantum dot is green.

Wherein the display panel comprises an array substrate, the array substrate comprises an electric control layer disposed in the non-display area, the electric control layer comprises a plurality of thin-film transistors arranged at intervals; the electromagnetic induction layer comprises a plurality of electromagnetic induction electrodes arranged at intervals; and the plurality of thin-film transistors are correspondingly connected to the plurality of electromagnetic induction electrodes one to one.

Wherein the electromagnetic induction layer is located on a side of the electric control layer facing the backlight module.

Wherein a direction of the directional magnetic field generated by the electromagnetic induction electrodes in the energized state is a direction pointing vertically to the quantum dot film.

Wherein a cross-sectional shape of the electromagnetic induction electrode on a first plane is a spiral, and the first plane is a plane parallel to the quantum dot film.

Wherein a light-shielding layer is disposed on a side of the electric control layer away from the quantum dot film, each of the plurality of thin-film transistors comprises a source electrode and a drain electrode, and the plurality of thin-film transistors are correspondingly connected to the plurality of electromagnetic induction electrodes one to one through the corresponding drain electrodes.

Wherein the quantum dot film further comprises a mesoporous material, and/or the magnetic particles are transparent magnetic particles.

Wherein the display panel further comprises an electromagnetic shielding layer, the electromagnetic shielding layer is located above the electromagnetic induction layer, and an orthographic projection of the electromagnetic induction layer on the backlight plate falls within an orthographic projection of the electromagnetic shielding layer on the backlight plate.

Wherein a material of the electromagnetic induction layer comprises indium tin oxide, indium gallium zinc oxide, or indium zinc oxide.

The beneficial effects of the present invention are: different from prior arts, the present invention provides a display device, the display device comprises a backlight module and a display panel located above the backlight module; the display panel comprises a display area and a non-display area surrounding the display area, and an electromagnetic induction layer is disposed in the non-display area of the display panel; the backlight module comprises a backlight plate; a first-color light source disposed on a side of the backlight panel facing the display panel; a quantum dot film disposed between the first-color light source and the display panel; wherein the quantum dot film contains a plurality of second-color quantum dots, a plurality of third-color quantum dots, and a plurality of magnetic particles distributed discretely, the quantum dot film extends to below the electromagnetic induction layer; the quantum dot film comprises an edge area located in the non-display area and a central area located in the display area; the electromagnetic induction layer is configured to generate a directional magnetic field in an energized state to make the magnetic particles move directionally in the quantum dot film, and to make a density of the second-color quantum dots and the third-color quantum dots located in the edge area of the quantum dot film greater than a density of the second-color quantum dots and the third-color quantum dots located in the central area of the quantum dot film; by changing a distribution of the second-color quantum dots and the third-color quantum dots in the quantum dot film, the problem of blue light leakage of the display panel is improved, and the display effect of the display panel is improved.

DETAILED DESCRIPTION OF PREFERRED EMBODIMENTS

Figure 1:
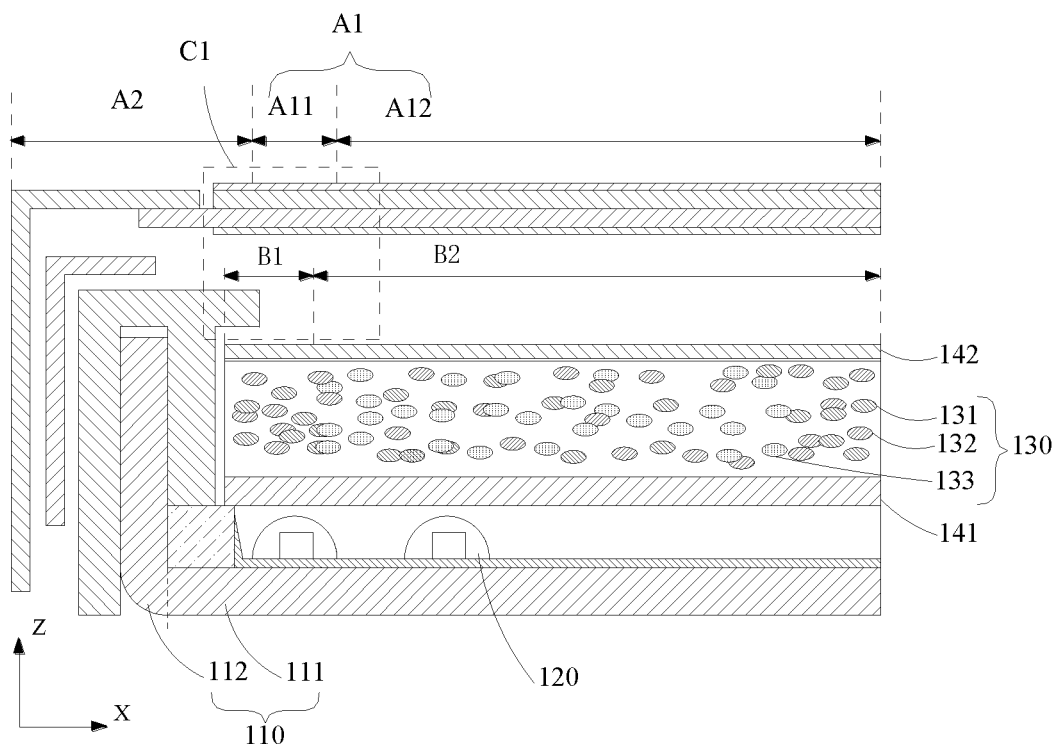
FIG. 1 is a schematic structural diagram of a display device provided by the present invention.

The present invention will be further described in detail with reference to the drawings and embodiments. In particular, the following embodiments are only used to explain the present invention, but do not limit the scope of the present invention. Similarly, the following embodiments are only part of the embodiments of the present invention, not all of them. All other embodiments obtained by a person skilled in the art without making creative labor belong to the scope of protection of the present invention.

In the description of the present invention, it should be understood that the orientation or positional relationship indicated by the terms "center", "transverse", "up", "down", "left", "right", "vertical", "horizontal", "top", "bottom", "inner", "outer" and the like are based on the orientation or positional relationship shown in the drawings, only for convenience of describing the present invention and simplifying the description, rather than indicating or implying that devices or elements referred to must have a specific orientation, be configured and operate in a specific orientation, and therefore cannot be understood as limiting the present invention.

In addition, the terms first, second, third, etc. mentioned in the present invention can be used to describe various elements, but these elements should not be limited to these terms. These terms are only used to distinguish these elements from each other. For example, without departing from the scope of the present application, a first type can be referred to as a second type, and similarly, the second type can be referred to as the first type. Therefore, the terms used are intended to explain and understand the present invention, and are not intended to limit the present invention. In each drawing, elements with similar structures are denoted by the same reference numerals. For the sake of clarity, various parts in the drawings are not drawn to scale. In addition, some well-known parts may not be shown in the drawings.

In addition, in each of the drawings, elements having similar structures are denoted by the same reference numerals. When a component is described as "connected" to another component, the two can be understood as "connected" directly, or a component is indirectly "connected" to another component through an intermediate component.

In order to make objects, technical schemes, and advantages of the present invention clearer, the present invention will be further described in detail below in combination with the drawings.

Figure 2:
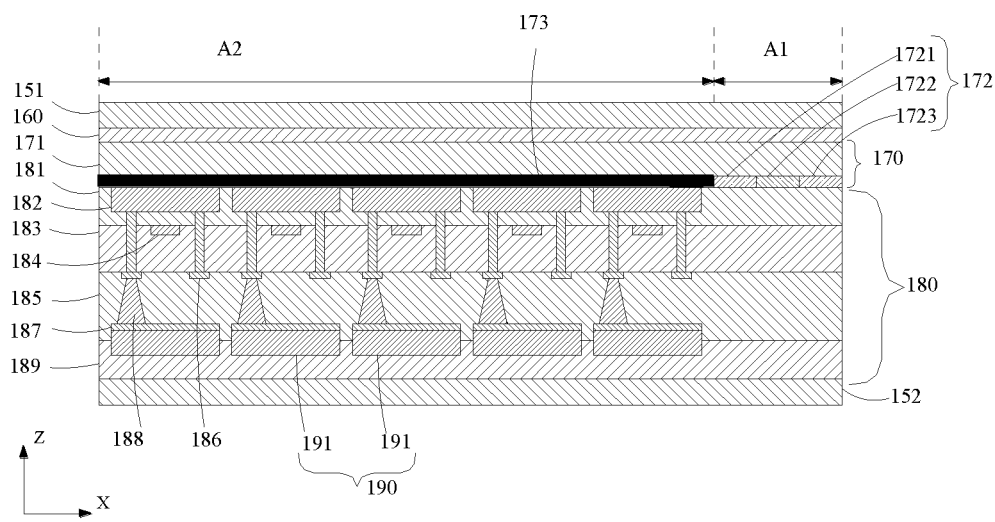
FIG. 2 a partial enlarged view of a block area C1 in FIG. 1.

As shown in FIG. 1, FIG. 1 is a schematic structural diagram of a display device provided by the present invention. FIG. 2 is a partial enlarged view of a block area C1 in FIG. 1. The present invention provides the display device, comprising a backlight module (not shown in the figures) and a display panel (not shown in the figures) located above the backlight module.

The display panel comprises a display area (area A1) and a non-display area (area A2) surrounding the display area, and an electromagnetic induction layer 190 is disposed in the non-display area of the display panel.

The backlight module comprises:
a backlight plate 110;
a first-color light source 120 provided on a side of the backlight plate 110 facing the display panel;
a quantum dot film 130 disposed between the first-color light source 120 and the display panel; wherein the quantum dot film 130 contains a plurality of second-color quantum dots 131, a plurality of third-color quantum dots 132, and a plurality of magnetic particles 133 distributed discretely; the quantum dot film 130 extends to below the electromagnetic induction layer 190; the quantum dot film 130 comprises an edge area (B1 area) located in the non-display area (A2 area) and a central area (B2 area) located in the display area (A1 area); and
the electromagnetic induction layer 190 is configured to generate a directional magnetic field in an energized state to make the magnetic particles 133 move directionally in the quantum dot film 130, so that a density of the second-color quantum dots 131 and the third-color quantum dots 132 located in the edge area (B1 area) of the quantum dot film 130 is greater than a density of the second-color quantum dots 131 and the third-color quantum dots 132 located in the central area (B2 area) of the quantum dot film 130.

In addition, it should be noted that FIG. 1 only shows a structure related to the embodiments of the present invention, and the display device of the present invention can further comprise other components and/or structures for realizing complete functions of the display device.

Specifically, the backlight plate 110 can be configured to support and fix the first-color light source 120. Wherein, the backlight plate 110 can comprise a backlight plate body 111 and a sidewall 112 surrounding the backlight plate body 111. The backlight plate body 111 and the sidewall 112 together form a receiving cavity in which the first-color light source 120 and the quantum dot film 130 can be accommodated. That is, the backlight plate body 111 can support the first-color light source 120 and the quantum dot film 130, and the sidewall 112 of the backlight plate 110 can be disposed around side surfaces of the first-color light source 120 and the quantum dot film 130. The first-color light source 120 and the quantum dot film 130 can be jointly supported and fixed by the backlight plate body 111 and the sidewall 112 of the backlight plate 110 to improve stability and compactness of the display panel. Wherein the backlight plate 110 can be made of an opaque material to achieve a light-shielding effect and avoid light leakage of the backlight module in the display panel. The backlight plate 110 can also be made of a material with good thermal conductivity to facilitate heat dissipation of the backlight module, reduce heat accumulation, and reduce thermal quenching effect of the quantum dot film 130. The backlight plate 110 can also be made of metal materials, such as aluminum, aluminum alloy, stainless steel, etc.

As shown in FIG. 1, the first-color light source 120 is disposed on a side of the backlight plate 110 and fixed to the backlight plate 110. Wherein the first-color light source 120 can be a mini-LED or a micro-LED. The first-color light source 120 can be fixed to the backlight plate 110 by adhesion or other means. For example, the first-color light source 120 can be fixed to the backlight plate 110 by a heat conductive adhesive, so that heat generated by the first-color light source 120 can be conducted to the backlight plate 110 and emitted to a surrounding environment through the backlight plate 110.

As shown in FIG. 1, the quantum dot film 130 is disposed above the first-color light source 120. The quantum dot film 130 comprises the plurality of second-color quantum dots 131, the plurality of third-color quantum dots 132, and the plurality of magnetic particles 133. Wherein quantum dots are nano-level semiconductors. By applying a certain electric field or a light pressure to the nano-semiconductor materials, they will emit light with a specific frequency, and the frequency of the emitted light will change with a size of the semiconductor. Therefore, a color of the light emitted by the nano-semiconductor can be controlled by adjusting the size of the nano-semiconductor. Wherein since quantum dots have advantages of high chromaticity, long life, good stability, and color formulation, the quantum dots can be applied to backlight modules to greatly improve color reproducibility, color degree, and an overall brightness of picture images. In addition, the display panel can further comprise a diffusion plate 141 disposed below the quantum dot film 130 and an optical film 142 disposed above the quantum dot film 130. The optical film 142 can comprise an upper brightener and a lower brightener (not shown in the figures).

Specifically, in general, particle sizes of the quantum dots are between 1 nm-20 nm. After being excited by external energy (such as a light pressure, an electric field), quantum dots of different sizes can emit light of different colors. Wherein, emission colors of the quantum dots can cover an entire visible area from blue light to red light. In general, sizes of red quantum dots can be 7 nm, and sizes of green quantum dots can be 3 nm. As shown in FIG. 1, the first-color light source 120 located on a side of the backlight 110 emits first color light (such as blue light), the blue light is irradiated into the quantum dot film 130; the red quantum dots located in the quantum dot film 130 are converted into red light under an irradiation of the blue light; the green quantum dots located in the quantum dot film 130 are converted into green light under the irradiation of the blue light, and neutralized with the blue light generated by the first-color light source 120, so that light emitted from the first-color light source 120 becomes white light after passing through the quantum dot film 130 for use by the backlight module in the display panel. That is, through a joint action of the first-color light source 120 and the quantum dot film 130, the white light required by the backlight module can be obtained. By applying quantum dots (such as red quantum dots and green quantum dots) to the backlight module, color reproducibility, chromaticity, and the overall brightness of the picture images can be greatly improved.

At present, display technologies are increasingly developing towards high performances such as high definition, high color gamut, and high brightness. mini-LED backlight module technology has characteristics of high brightness and high contrast, which brings a visual experience far better than traditional backlight modules to users. According to surveys, e-sports players have special requirements for high-resolution, high color rendering, and cool external appearance, and their consumption desire for upgrading hardware to obtain a better game experience is higher than that of users in other fields. A combination of high color rendering, high-resolution also overlaps with needs of professional display users. Designs of mini-LED backlight modules can easily meet a high-end market demand. At present, mini-LED technology continues to develop in a direction of high partition, zero even light distance, and thinness, and has replaced OLED technology to become a mainstream of market. However, ultra-thin and zero even distance are followed by a problem of blue light leakage around the modules. Traditionally, an only solution to solve the blue light leakage around the mini-LED modules is to screen print yellow fluorescent powder around a diaphragm to neutralize the blue light leakage around. However, this scheme needs to repeatedly adjust a phosphor ratio to ensure that a display color of a peripheral is consistent with a display color of an overall display of the module, and development and commissioning cycle is long.

Based on this, by using the display device according to the embodiments of the present invention, the magnetic particles 133 are added to the quantum dot film 130, and the electromagnetic induction layer 190 is disposed above the quantum dot film 130. The electromagnetic induction layer 190 generates a directional magnetic field when energized, so that the magnetic particles 133 move directionally within the quantum dot film 130. Specifically, the magnetic particles 133 move from an edge toward the central area, and the second-color quantum dots 131 and the third-color quantum dots 132 originally located in the central area are pushed into the edge area (B1 area) of the quantum dot film 130, so that the density of the second-color quantum dots 131 and the third-color quantum dots 132 located in the edge area (B1 area) of the quantum dot film 130 is greater than the density of the second-color quantum dots 131 and the third-color quantum dots 132 located in the central area (B2 area) of the quantum dot film 130, and number of the second-color quantum dots 131 and the third-color quantum dots 132 in the edge area (B1 area) of the quantum dot film 130 increases. Thus, compared with the prior arts, more blue light emitted from a periphery of the backlight module can be converted into red light and green light by the second-color quantum dots 131 and the third-color quantum dots 132 gathered in the edge area, and the problem of blue light leakage around the backlight module can be improved, and a consistent color difference between the periphery of the backlight module and the display area of the backlight module is achieved. That is, by using the display panel according to the embodiments of the present invention, it is possible to adjust a density distribution of the second-color quantum dots 131 and the third-color quantum dots 132 in the quantum dot film 130 based on electromagnetic induction principle to improve the problem of blue light leakage of the display panel. At a same time, compared with the scheme in the prior arts that requires repeated adjustment of the phosphor ratio, a scheme of changing the density distribution of the second-color quantum dots 131 and the third-color quantum dots 132 by adjusting the intensity of the magnetic field can greatly reduce a debugging period for improving the blue light leakage problem.

Wherein a color of the first-color light source 120 is blue, a color of the second-color quantum dots 131 is red, and a color of the third-color quantum dots 132 is green.

Figure 3:
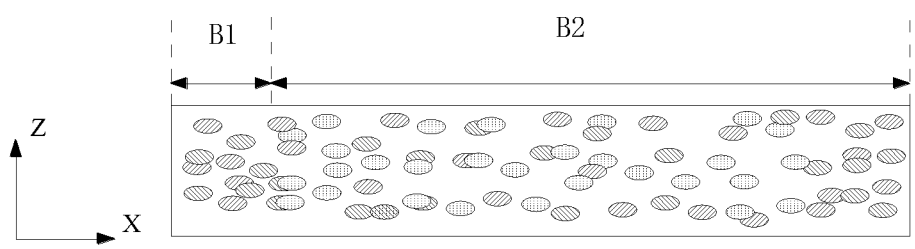
FIG. 3 is a schematic structural diagram of a quantum dot film provided by the present invention.

Specifically, as shown in FIG. 3, FIG. 3 is a schematic structural diagram of a quantum dot film provided by the present invention. As shown in FIG. 3, the density of the second-color quantum dots 131 and the third-color quantum dots 132 located in the edge area (area B1) of the quantum dot film 130 is greater than the density of the second-color quantum dots 131 and the third-color quantum dots 132 located in the central area (area B2) of the quantum dot film 130. The color of the first-color light source 120, the color of the second-color quantum dots 131, and the color of the third-color quantum dots 132 are neutralized to white. For example, the color of the first-color light source 120 can be blue, the second-color quantum dots 131 can be red quantum dots, and the third-color quantum dots 132 can be green quantum dots. A density of the edge area (B1 area) of the quantum dot film 130 can be increased by the action of an applied magnetic field. When the blue light emitted by the first-color light source 120 passes through the quantum dot film 130, more blue light is converted into red light and green light, thereby reducing the amount of blue light at a position where blue light leaks around the display area, and further improving the problem of blue light leakage. Under the action of the applied magnetic field, a distribution of the magnetic particles 133 changes, and a position change of the magnetic particles 133 occupies a space of the quantum dots (such as the second-color quantum dots 131 or the third-color quantum dots 132), so that a distribution of the quantum dots changes synchronously.

In addition, it should be noted that, in addition to changing the density distribution of the quantum dots by the action of the applied magnetic field, other methods can be adopted as long as the density of the second-color quantum dots 131 and the third-color quantum dots 132 located in the edge area (area B1) of the quantum dot film 130 is greater than the density of the second-color quantum dots 131 and the third-color quantum dots 132 located in the central area (area B2) of the quantum dot film 130. In addition, the problem of blue light leakage can be further improved by adjusting an operating current of the electromagnetic induction layer 190, thereby adjusting the intensity of the applied magnetic field, and further adjusting the density of the second-color quantum dots 131 and the third-color quantum dots 132 located in the edge area (B1 area) of the quantum dot film 130. The intensity of the applied magnetic field can be set according to an actual process requirements and is not particularly limited.

Wherein the magnetic particles 133 are transparent magnetic particles 133.

Specifically, the magnetic particles 133 can be transparent magnetic particles 133 in order to ensure permeability of the display panel while improving the problem of blue leakage of the display panel. In general, diameters of the magnetic particles 133 are very small, in an order of nanometers, that is, the magnetic particles 133 can be transparent magnetic nanoparticles.

Wherein a material of the electromagnetic induction layer 190 comprises indium tin oxide, indium gallium zinc oxide, or indium zinc oxide.

Specifically, the material of the electromagnetic induction layer 190 can be a transparent material such as indium tin oxide (ITO), indium zinc oxide (IZO), or indium gallium zinc oxide (IGZO) in order to ensure penetration of the display panel while improving the problem of blue leakage of the display panel. In addition, it should be noted that the electromagnetic induction layer 190 can also be other transparent conductive materials and is not particularly limited.

Wherein the quantum dot film 130 further comprises a mesoporous material.

Specifically, it can be seen from the above that aggregation or dispersion of the magnetic particles 133 can be regulated by applying the applied magnetic field, thereby regulating aggregation or dispersion of the quantum dots (such as the second-color quantum dots 131 and the third-color quantum dots 132) to improve the problem of blue light leakage. By using the quantum dot film 130 with the mesoporous material, an elasticity of the quantum dot film 130 can be increased, which is more conducive to a movement of the magnetic particles 133 and the quantum dots in the quantum dot film 130, so that the aggregation or the dispersion of the magnetic particles 133 can be controlled by the applied magnetic field, and the aggregation or the dispersion of the quantum dots (such as the second-color quantum dots 131 and the third-color quantum dots 132) can be controlled. A working principle of the quantum dot film 130 to adjust the distribution of the quantum dots in the film can be that under an action of a controllable magnetic field, the magnetic particles 133 gather or disperse in transparent elastic carriers of the mesoporous material, so that the transparent elastic carriers contract or expand, and the density of the quantum dots in the edge area of the quantum dot film 130 changes at any time when the transparent elastic carriers contract or expand. Wherein the intensity of the applied magnetic field can be controlled by controlling the operating current of the electromagnetic induction layer 190. The mesoporous material can be any transparent elastic material, such as mesoporous silica material. In addition, the mesoporous material can also be a mesoporous titanium dioxide material or a mesoporous zinc dioxide material. In addition, a mesoporous pore diameter of the mesoporous material can match a particle diameter of the quantum dots (for example, the second-color quantum dots 131 and the third-color quantum dots 132), so that the quantum dots can be embedded into the mesoporous of the mesoporous material.

Specifically, the display panel comprises the display area (area A1) and the non-display area (area A2), and the electromagnetic induction layer 190 can be located in the non-display area to ensure the penetration of the display panel while improving the problem of blue leakage of the display panel. At a same time, by providing the electromagnetic induction layer 190 in the non-display area, an influence of the electromagnetic induction layer 190 on the display area is reduced. The non-display area can be disposed around the display area, and correspondingly, the electromagnetic induction layer 190 can be located in the non-display area disposed around the display area. For example, the electromagnetic induction layer 190 can be disposed around the display area to improve the problem of blue light leakage around the display area. The display area A1 comprises a display area (A11 area) that does not leak blue light and a display area (A12 area) that leaks blue light.

Wherein the display panel comprises an array substrate 180; the array substrate 180 comprises an electric control layer (not shown in the figures) disposed in the non-display area; and the electric control layer comprises a plurality of thin-film transistors (not shown in the figures) arranged at intervals. The electromagnetic induction layer 190 comprises a plurality of electromagnetic induction electrodes 191 arranged at intervals. The plurality of thin-film transistors are correspondingly connected to the plurality of electromagnetic induction electrodes 191 one to one.

A light-shielding layer 173 is further disposed on a side of the electronic control layer away from the quantum dot film 130. The thin-film transistors comprise a source electrode 186 and a drain electrode 187. The plurality of thin-film transistors are correspondingly connected to the plurality of electromagnetic induction electrodes 191 one to one through the corresponding drain electrode 187.

As shown in FIG. 2, the display panel can further comprise the array substrate 180. In addition, the display panel can further comprise a color film substrate 170. As shown in FIG. 2, the color film substrate 170 comprises an upper glass substrate 171, a color resist layer 172, and the light-shielding layer 173 located below the upper glass substrate 171, wherein the color resist layer 172 comprises a red color resist layer 1721, a green color resist layer 1722, and a blue color resist layer 1723. The array substrate 180 comprises a lower glass substrate 189 and the electromagnetic induction layer 190, a planarization layer 185, an interlayer insulating layer 183, and a gate electrode insulating layer 181 stacked on the lower glass substrate. The array substrate 180 further comprises the electric control layer disposed in the non-display area, the electric control layer comprises the plurality of thin-film transistors arranged at intervals, and the electromagnetic induction layer 190 comprises the plurality of electromagnetic induction electrodes 191 arranged at intervals. The plurality of thin-film transistors are correspondingly connected to the plurality of electromagnetic induction electrodes one to one. The thin-film transistor comprises an active layer 182, the source electrode 186, the drain electrode 187, and a gate electrode layer 184. The source electrode 186 and the drain electrode 187 are electrically connected to the active layer 182 through the interlayer insulating layer 183 and the gate electrode insulating layer 181, respectively. The plurality of thin-film transistors are correspondingly connected to the plurality of electromagnetic induction electrodes through corresponding drain electrodes 187. A plurality of conductive pillars 188 are provided in the flat layer 185. The conductive pillars 188 are electrically connected to the drain electrode 187, and the drain electrode 187 is electrically connected to the electromagnetic induction electrode 191. The corresponding electromagnetic induction electrode 191 can be supplied with power through the thin-film transistor (TFT) corresponding to the drain electrode 187 in the array substrate 180. The gate electrode layer 184 can be electrically connected to a gate line, and the source electrode 186 can be electrically connected to a common electrode line. In addition, the display panel can further comprise a liquid crystal layer (not shown in the figure) between the color film substrate 170 and the array substrate 180. In addition, an upper polarizer 151 is disposed above the color film substrate, and a lower polarizer 152 is disposed below the array substrate.

Specifically, a material of the gate electrode insulating layer 181 can be an oxide, such as silicon oxide. A material of the interlayer insulating layer 183 can be an oxide, such as silicon oxide. A material of the gate electrode layer 184 can be a metal material, such as aluminum, copper, or tungsten. A material of the active layer 182 can comprise a metal semiconductor oxide, such as ITO (indium tin oxide), IZO (indium zinc oxide), or IGZO (indium gallium zinc oxide).

Wherein the electromagnetic induction layer 190 is located on a side of the electric control layer facing the backlight module.

Specifically, the electromagnetic induction layer 190 can be located below the electric control layer, that is, the electromagnetic induction layer 190 is located on the side of the electric control layer facing the backlight module to ensure that the electromagnetic induction layer 190 is adjacent to the quantum dot film 130.

A cross-sectional shape of the electromagnetic induction electrode 191 on a first plane is a spiral, and the first plane (XY plane) is a plane parallel to the quantum dot film 130.

Wherein a direction of the magnetic field generated by the electromagnetic induction electrode 191 in the energized state is a direction pointing vertically to the quantum dot film 130 (that is, a direction from the electromagnetic induction electrode 191 to the quantum dot film 130).

Figure 4:
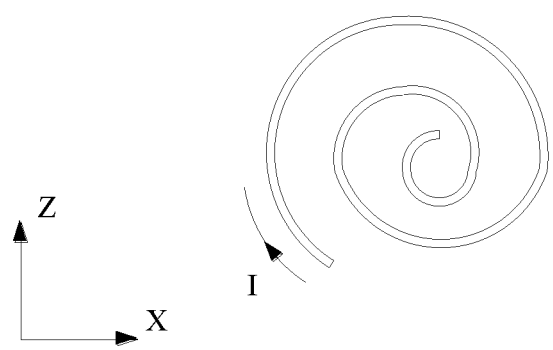
FIG. 4 is a top-view of an electromagnetic induction electrode.

As shown in FIG. 4, FIG. 4 is a top-view image of an electromagnetic induction electrode. The cross-sectional shape of the electromagnetic induction electrode 191 on the first plane (XY plane) is the spiral. By using a spiral shaped electromagnetic induction electrode 191, a spiral shaped current line can be formed. Bases on an electric field induction effect, the spiral shaped current line generates a magnetic field, so that the magnetic particles 133 located in the quantum dot film 130 gather or disperse, thereby adjusting the distribution of the quantum dots in the quantum dot film 130. In addition, it should be noted that the current direction of the spiral shaped electromagnetic induction electrode 191 can be set according to actual process requirements. For example, when the electromagnetic induction electrode 191 is located in the non-display area on a left side, a current direction I (that is, a current direction from an outside of the spiral to an inside of the spiral) as shown in FIG. 4 can be generated by adjusting the spiral shaped electromagnetic induction electrode 191, and the direction of the magnetic field can be determined as a downward direction by the right-hand spiral theorem. At this time, under the action of the applied magnetic field generated by the electromagnetic induction electrode 191, the magnetic particles 133 located in the quantum dot film 130 move to rightward, correspondingly, the second-color quantum dots 131 and the third-color quantum dots 132 are more concentrated on a left side of the quantum dot film 130, so that more blue light emitted from the periphery of the backlight module can be converted into red light and green light by the second-color quantum dots 131 and the third-color quantum dots 132 concentrated in the edge area, thereby improving the problem of blue light leakage around the backlight module.

The electromagnetic shielding layer 160 is located above the electromagnetic induction layer 190, and an orthographic projection of the electromagnetic induction layer 190 on the backlight plate 110 falls within an orthographic projection of the electromagnetic shielding layer 160 on the backlight plate 110.

Specifically, in order to reduce an influence of the applied magnetic field on the devices in the display panel as much as possible on the premise of improving the problem of blue leakage of the display panel, the display panel can further comprise the electromagnetic shielding layer 160 to shield the applied magnetic field. The electromagnetic shielding layer 160 can be located above the electromagnetic induction layer 190, and the electromagnetic shielding layer 160 at least covers the electromagnetic induction layer 190 in a direction (z direction) perpendicular to the backlight plate 110 (that is, the electromagnetic shielding layer 160 is located above the electromagnetic induction layer 190, and the orthographic projection of the electromagnetic induction layer 190 on the backlight plate 110 falls within the orthographic projection of the electromagnetic shielding layer 160 on the backlight plate 110).

Wherein the electromagnetic shielding layer 160 covers the non-display area and at least part of the display area.

Specifically, in order to further shield the applied magnetic field, the electromagnetic shielding layer 160 covers at least the non-display area and at least part of the display area in the direction (z direction) perpendicular to the backlight plate 110. In addition, the electromagnetic shielding layer 160 can cover the non-display area and the entire display area in the direction (z direction) perpendicular to the backlight plate 110.

As all elements were discussed above, the present invention provides the display device, the display device comprises the backlight module and the display panel located above the backlight module. The display panel comprises the display area and the non-display area surrounding the display area, and the electromagnetic induction layer is disposed in the non-display area of the display panel. The backlight module comprises the backlight plate; the first-color light source disposed on the side of the backlight panel facing the display panel; the quantum dot film disposed between the first-color light source and the display panel; wherein the quantum dot film contains the plurality of second-color quantum dots, the plurality of third-color quantum dots, and the plurality of magnetic particles distributed discretely, the quantum dot film extends to below the electromagnetic induction layer; the quantum dot film comprises the edge area located in the non-display area and the central area located in the display area; the electromagnetic induction layer is configured to generate the directional magnetic field in the energized state to make the magnetic particles move directionally in the quantum dot film, and to make the density of the second-color quantum dots and the third-color quantum dots located in the edge area of the quantum dot film greater than the density of the second-color quantum dots and the third-color quantum dots located in the central area of the quantum dot film. By adjusting a distribution of the second-color quantum dots and the third-color quantum dots in the quantum dot film, the problem of blue light leakage of the display panel is improved, and the display effect of the display panel is improved.

The above description is only preferred embodiments of the present invention and is not intended to limit the present invention. Any modification, equivalent replacement and improvement made within the spirit and principles of the present invention shall be included in the scope of protection of the present invention.

What is claimed is:

1. A display device, comprising a backlight module and a display panel located above the backlight module;
   wherein the display panel comprises a display area and a non-display area surrounding the display area, an electromagnetic induction layer is disposed in the non-display area of the display panel;
   and the backlight module comprises:
   a backlight plate;
   a first-color light source disposed on a side of the backlight plate facing the display panel;
   a quantum dot film disposed between the first-color light source and the display panel, wherein the quantum dot film contains a plurality of second-color quantum dots, a plurality of third-color quantum dots, and a plurality of magnetic particles distributed discretely, the quantum dot film extends to below the electromagnetic induction layer; the quantum dot film comprises an edge area located in the non-display area and a central area located in the display area; and
   the electromagnetic induction layer is configured to generate a directional magnetic field in an energized state to make the magnetic particles move directionally in the quantum dot film, and to make a density of the second-color quantum dots and the third-color quantum dots located in the edge area of the quantum dot film greater than a density of the second-color quantum dots and the third-color quantum dots located in the central area of the quantum dot film.

2. The display device as claimed in claim 1, wherein a color of the first-color light source is blue, a color of the second-color quantum dot is red, and a color of the third-color quantum dot is green.

3. The display device as claimed in claim 1, wherein the display panel further comprises an array substrate, the array substrate comprises an electric control layer disposed in the non-display area, the electric control layer comprises a plurality of thin-film transistors arranged at intervals; the electromagnetic induction layer comprises a plurality of electromagnetic induction electrodes arranged at intervals; and the plurality of thin-film transistors are correspondingly connected to the plurality of electromagnetic induction electrodes one to one.

4. The display device as claimed in claim 3, wherein the electromagnetic induction layer is located on a side of the electric control layer facing the backlight module.

5. The display device as claimed in claim 3, wherein a direction of the directional magnetic field generated by the electromagnetic induction electrodes in the energized state is a direction pointing vertically to the quantum dot film.

6. The display device as claimed in claim 3, wherein a cross-sectional shape of the electromagnetic induction electrode on a first plane is a spiral, and the first plane is a plane parallel to the quantum dot film.

7. The display device as claimed in claim 3, wherein a light-shielding layer is disposed on a side of the electric control layer away from the quantum dot film, each of the plurality of thin-film transistors comprises a source electrode and a drain electrode, and the plurality of thin-film transistors are correspondingly connected to the plurality of electromagnetic induction electrodes one to one through corresponding drain electrodes.

8. The display device as claimed in claim 1, wherein the quantum dot film further comprises a mesoporous material, and/or the magnetic particles are transparent magnetic particles.

9. The display device as claimed in claim 1, wherein the display panel further comprises an electromagnetic shielding layer, the electromagnetic shielding layer is located above the electromagnetic induction layer, and an orthographic projection of the electromagnetic induction layer on the backlight plate falls within an orthographic projection of the electromagnetic shielding layer on the backlight plate.

10. The display device as claimed in claim 1, wherein a material of the electromagnetic induction layer comprises indium tin oxide, indium gallium zinc oxide, or indium zinc oxide.

11. A display device, comprising a backlight module and a display panel located above the backlight module;
    wherein the display panel comprises a display area and a non-display area surrounding the display area, an electromagnetic induction layer is disposed in the non-display area of the display panel;
    and the backlight module comprises:
    a backlight plate;
    a first-color light source disposed on a side of the backlight plate facing the display panel;
    a quantum dot film disposed between the first-color light source and the display panel, wherein the quantum dot film contains a plurality of second-color quantum dots, a plurality of third-color quantum dots, and a plurality of magnetic particles distributed discretely, the quantum dot film extends to below the electromagnetic induction layer; the quantum dot film comprises an edge area located in the non-display area and a central area located in the display area;
    the electromagnetic induction layer is configured to generate a directional magnetic field in an energized state to make the magnetic particles move directionally in the quantum dot film, and to make a density of the second-color quantum dots and the third-color quantum dots located in the edge area of the quantum dot film greater than a density of the second-color quantum dots and the third-color quantum dots located in the central area of the quantum dot film;
    wherein a working current of the electromagnetic induction layer is configured to make the density of the second-color quantum dots and the third-color quantum dots located in the edge area of the quantum dot film correspond to the working current.

12. The display device as claimed in claim 11, wherein a color of the first-color light source is blue, a color of the second-color quantum dot is red, and a color of the third-color quantum dot is green.

13. The display device as claimed in claim 11, wherein the display panel further comprises an array substrate, the array substrate comprises an electric control layer disposed in the non-display area, the electric control layer comprises a plurality of thin-film transistors arranged at intervals; the electromagnetic induction layer comprises a plurality of electromagnetic induction electrodes arranged at intervals; and the plurality of thin-film transistors are correspondingly connected to the plurality of electromagnetic induction electrodes one to one.

14. The display device as claimed in claim 13, wherein the electromagnetic induction layer is located on a side of the electric control layer facing the backlight module.

15. The display device as claimed in claim 13, wherein a direction of the directional magnetic field generated by the electromagnetic induction electrodes in the energized state is a direction pointing vertically to the quantum dot film.

16. The display device as claimed in claim 13, wherein a cross-sectional shape of the electromagnetic induction electrode on a first plane is a spiral, and the first plane is a plane parallel to the quantum dot film.

17. The display device as claimed in claim 13, wherein a light-shielding layer is disposed on a side of the electric control layer away from the quantum dot film, each of the plurality of thin-film transistors comprises a source electrode and a drain electrode, and the plurality of thin-film transistors are correspondingly connected to the plurality of electromagnetic induction electrodes one to one through corresponding drain electrodes.

18. The display device as claimed in claim 11, wherein the quantum dot film further comprises a mesoporous material, and/or the magnetic particles are transparent magnetic particles.

19. The display device as claimed in claim 11, wherein the display panel further comprises an electromagnetic shielding layer, the electromagnetic shielding layer is located above the electromagnetic induction layer, and an orthographic projection of the electromagnetic induction layer on the backlight plate falls within an orthographic projection of the electromagnetic shielding layer on the backlight plate.

20. The display device as claimed in claim 11, wherein a material of the electromagnetic induction layer comprises indium tin oxide, indium gallium zinc oxide, or indium zinc oxide.

* * * * *